United States Patent
Luzzatti et al.

(10) Patent No.: US 10,567,546 B2
(45) Date of Patent: Feb. 18, 2020

(54) NETWORK CONTENT COMMUNICATION

(71) Applicant: Oath Inc., New York, NY (US)

(72) Inventors: Omer Luzzatti, Palo Alto, CA (US);
Lev Korostyshevsky, Ramat Gan (IL);
Michael Kravchenko, Ashdod (IL);
Elad Rainshmidt, Ganei Tikva (IL)

(73) Assignee: Oath Inc., New York, NY (US)

( * ) Notice: Subject to any disclaimer, the term of this patent is extended or adjusted under 35 U.S.C. 154(b) by 410 days.

(21) Appl. No.: 14/986,115

(22) Filed: Dec. 31, 2015

(65) Prior Publication Data
US 2017/0195453 A1    Jul. 6, 2017

(51) Int. Cl.
*G06F 15/16* (2006.01)
*H04L 29/08* (2006.01)
*H04L 12/26* (2006.01)

(52) U.S. Cl.
CPC ............. *H04L 67/32* (2013.01); *H04L 43/08* (2013.01); *H04L 67/1097* (2013.01); *H04L 67/2847* (2013.01)

(58) Field of Classification Search
CPC ...... H04L 43/08; H04L 67/2847; H04L 67/32
See application file for complete search history.

(56) References Cited

U.S. PATENT DOCUMENTS

| | | | | |
|---|---|---|---|---|
| 9,021,134 B1* | 4/2015 | Patel | ............... | H04L 67/2823 709/246 |
| 2003/0061369 A1* | 3/2003 | Aksu | ............... | H04L 29/06027 709/231 |
| 2004/0025106 A1* | 2/2004 | Massey | ............ | H03M 13/2957 714/786 |
| 2010/0228875 A1* | 9/2010 | Myers | ............... | H04L 65/608 709/231 |
| 2012/0192039 A1* | 7/2012 | Hannuksela | ........ | H04L 1/0009 714/776 |
| 2012/0295716 A1* | 11/2012 | Lee | ................ | H04L 69/08 463/42 |
| 2013/0176390 A1* | 7/2013 | Chen | ............... | H04N 19/597 348/43 |
| 2015/0058492 A1* | 2/2015 | Meloche | ............ | H04L 69/40 709/228 |
| 2015/0095739 A1* | 4/2015 | Zhovnirnovsky | ... | H03M 13/616 714/759 |
| 2015/0207834 A1* | 7/2015 | Zhao | ............... | H04N 21/631 709/231 |
| 2015/0355960 A1* | 12/2015 | Volvovski | ......... | G06F 11/0775 714/54 |
| 2016/0191402 A1* | 6/2016 | Anderson | ......... | H04N 21/2402 370/236 |
| 2016/0249065 A1* | 8/2016 | Haimi-Cohen | ........ | H04N 19/15 |

(Continued)

OTHER PUBLICATIONS

Cisco, "The Zettabyte Era—Trends and Analysis," http://www.cisco.com/c/en/us/solutions/collateral/service-provider/visual-networking-index-vni/VNI_Hyperconnectivity_WP.html, Copyright May 2015, 23 Pages.

(Continued)

*Primary Examiner* — Ario Etienne
*Assistant Examiner* — Kidest Mendaye
(74) *Attorney, Agent, or Firm* — Cooper Legal Group, LLC

(57) ABSTRACT

Briefly, embodiments of systems and/or method of communicating digital content via a network, such as a computing and/or communications network, are described.

20 Claims, 6 Drawing Sheets

(56) References Cited

U.S. PATENT DOCUMENTS

2016/0381177 A1* 12/2016 Minder .................. H04L 1/004 709/226
2017/0105044 A1* 4/2017 Ravindran ......... H04N 21/4663

OTHER PUBLICATIONS

Ooyala, "Ooyala's Q4 2013 Global Video Index Projects Mobile and Tablets to Account for Half of All Online Viewing by 2016," http://www.ooyala.com/about/press/ooyala%E2%80%99s-q4-2013-global-video-index-projects-mobile-and-tablets-account-half-all-online, Mar. 31, 2013, 4 Pages.

Mikko, et al, "Comparison of User Traffic Characteristics on Mobile-Access versus Fixed-Access Networks," N.Taft and F. Ricciato (Eds.): PAM 2012, LNCS 7192, Springer-Verlag Berlin Heidelberg 2012 pp. 32-41.

Apple Inc, "HTTP Live Streaming," https://developer.apple.com/streaming/, May 2009, 3 Pages.

ISO/IEC DIS 23009-1.2, "Dynamic Adaptive Streaming Over HTTP," http://www.iso.org/iso/iso_catalogue/catalogue_tc/catalogue_detail.htm?csnumber=57623, Apr. 1, 2012, 2 Pages.

Kim et al, "Congestion Control for Coded Transport Layers," http://www.iso.org/iso/iso_catalogue/catalogue_tc/catalogue_detail.htm?csnumber=57623, Jun. 2014, 7 Pages.

Quic, "Design Document and Specification Rationale," https://docs.google.com/document/d/1RNHkx_VvKWyWg6Lr8SZ-saqsQx7rFV-ev2jRFUoVD34/mobilebasic?pref=2&pli=1, Apr. 2012, 38 Pages.

Krishnan, "Impact of Video Stream Quality on Viewer Behavior: Inferring Causality Using Quasi-Experimental Designs," IMC '12, Nov. 14-16, 2012, Boston, MA, 14 Pages.

Chromium Blog, "A Quic Update on Google's Experimental Transport," http://blog.chromium.org/2015/04/a-quic-update-on-googles-experimental.html, Apr. 17, 2015, 3 Pages.

\* cited by examiner

NETWORK CONTENT COMMUNICATION

BACKGROUND

Field

Subject matter disclosed herein relates to communicating content, such as digital content, over a network.

Information

With networks, such as the Internet, gaining popularity, and with a vast multitude of content, such as pages, other electronic documents, other media content and/or applications (hereinafter 'digital content'), becoming available to users, such as via the World Wide Web (hereinafter 'Web'), it may be desirable to provide more efficient and/or more streamlined approaches to gather, organize, store, modify, search, and/or retrieve content, such as digital content, for example. Internet-type business entities, such as Yahoo!, for example, may provide a wide range of content storage, search, and/or retrieval services for a wide range of applications, for example. Such content storage, search, and/or retrieval services may involve distributed systems, particularly for large amounts of content to be accessed, stored, modified, and/or searched, for example, by large numbers of clients (e.g., client computing devices).

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1:
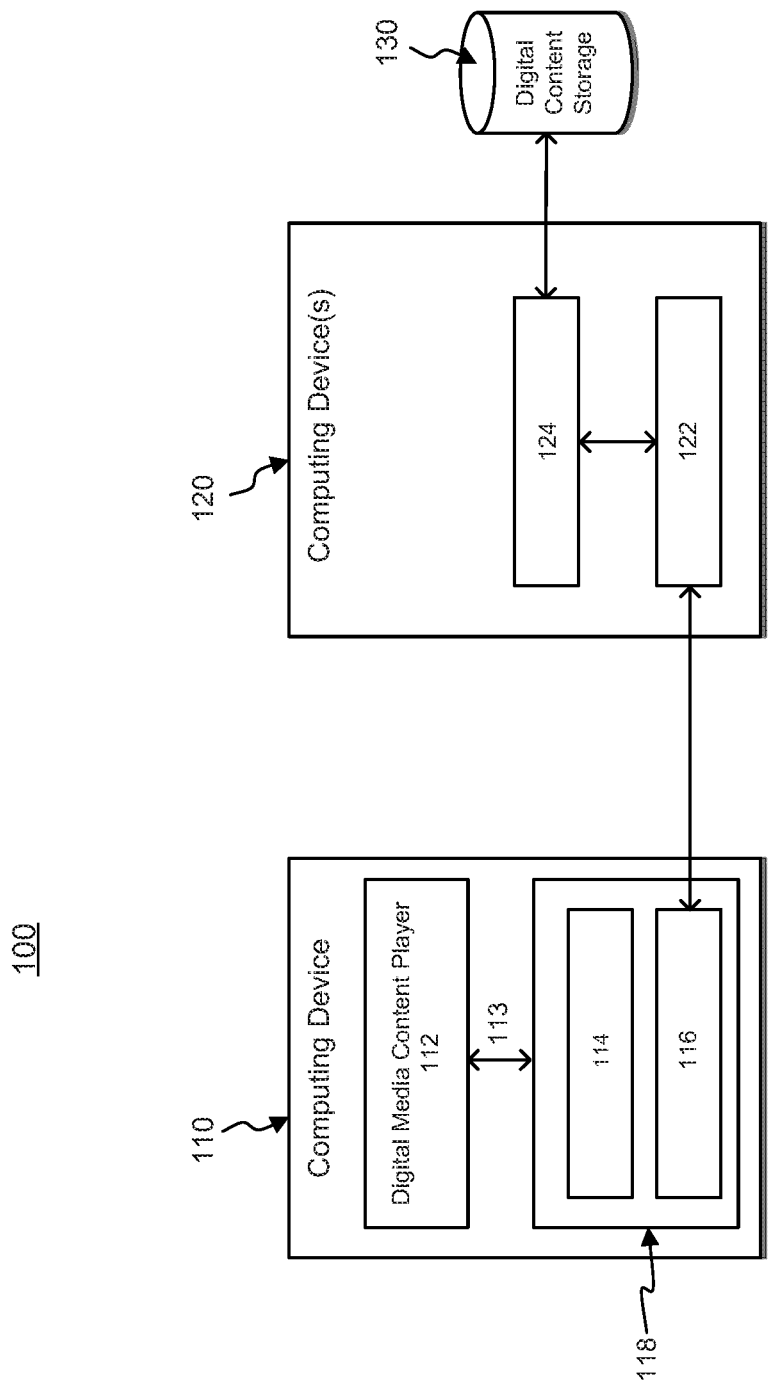
FIG. 1 is a schematic diagram illustrating an example system for network communications, in accordance with an embodiment.

Reference is made in the following detailed description to accompanying drawings, which form a part hereof, wherein like numerals may designate like parts throughout to indicate corresponding and/or analogous components. It will be appreciated that components illustrated in the figures have not necessarily been drawn to scale, such as for simplicity and/or clarity of illustration. For example, dimensions of some components may be exaggerated relative to other components. Further, it is to be understood that other embodiments may be utilized. Furthermore, structural and/or other changes may be made without departing from claimed subject matter. It should also be noted that directions and/or references, for example, such as up, down, top, bottom, and so on, may be used to facilitate discussion of drawings and/or are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described are capable of being combined in various ways in one or more implementations and/or embodiments and, therefore, are within intended claim scope, for example. In general, of course, these and other issues vary with context. Therefore, particular context of description and/or usage provides helpful guidance regarding inferences to be drawn.

With advances in technology, it has become more typical to employ distributed computing and/or communication approaches in which portions of a problem, such as signal processing of signal samples, for example, may be allocated among various devices, including one or more clients and/or one or more servers, via a computing and/or communications network, for example. A network may comprise two or more devices, such as network devices and/or computing devices, and/or may couple devices, such as network devices and/or computing devices, so that signal communications, such as in the form of signal packets (e.g., comprising one or more signal samples), for example, may be exchanged, such as between a server device and a client device and/or other types of devices, including between wireless devices coupled via a wireless network, for example.

An example of a distributed computing system comprises the Hadoop distributed computing system, which employs a map-reduce type of architecture. In this context, the terms map-reduce architecture and/or similar terms are intended to refer a distributed computing system implementation for processing and/or for generating large sets of signal samples employing a parallel, distributed process performed over a network of individual devices. A map operation and/or similar terms refer to processing of signals (e.g., signal samples) to generate one or more key-value pairs and to distribute the one or more pairs to devices of a system (e.g., network). A reduce operation and/or similar terms refer to processing of signals (e.g., signal samples) via a summary operation (e.g., such as counting the number of students in a queue, yielding name frequencies). A system may employ such an architecture for processing by marshaling distributed servers, running various tasks in parallel, and/or managing communications, such as signal transfers, between various parts of the system (e.g., network), in an embodiment. As mentioned, one non-limiting, but well-known, example comprises the Hadoop distributed computing system. It refers to an open source implementation of a map-reduce type architecture, but may include other aspects, such as the Hadoop distributed file system (HDFS). In general, therefore, Hadoop and/or similar terms refer to an implementation scheduler for executing large processing jobs using a map-reduce architecture over a distributed system.

Furthermore, here, use of the term "Hadoop" is intended to include presently known, existing versions of Hadoop and/or later developed versions of Hadoop.

In this context, the term network device refers to any device capable of communicating via and/or as part of a network and may comprise a computing device. While network devices may be capable of sending and/or receiving signals (e.g., signal packets) such as via a wired and/or wireless network, they may also be capable of performing arithmetic and/or logic operations, processing and/or storing signals (e.g., signal samples), such as in memory as physical memory states, and/or may, for example, operate as a server in various embodiments. Network devices capable of operating as a server, a client and/or otherwise, may include, as examples, dedicated rack-mounted servers, desktop computers, laptop computers, set top boxes, tablets, netbooks, smart phones, wearable devices, integrated devices combining two or more features of the foregoing devices, the like or any combination thereof. As mentioned, signal packets, for example, may be exchanged, such as between a server device and a client device and/or other types of network and/or computing devices, including between wireless devices coupled via a wireless network, for example. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description, a network device (also referred to as a networking device) may be embodied and/or described in terms of a computing device. However, it should further be understood that this description should in no way be construed that claimed subject matter is limited to one embodiment, such as a computing device and/or a network device, and, instead, may be embodied as a variety of devices or combinations thereof, including, for example, one or more illustrative examples.

Likewise, in this context, the terms "coupled", "connected," and/or similar terms are used generically. It should be understood that these terms are not intended as synonyms. Rather, "connected" is used generically to indicate that two or more components, for example, are in direct physical, including electrical, contact; while, "coupled" is used generically to mean that two or more components are potentially in direct physical, including electrical, contact; however, "coupled" is also used generically to mean that two or more components are not necessarily in direct contact, but nonetheless are able to co-operate and/or interact. The term coupled is also understood generically to mean indirectly connected, for example, in an appropriate context.

The terms, "and", "or", "and/or" and/or similar terms, as used herein, include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms is used to describe any feature, structure, and/or characteristic in the singular and/or is also used to describe a plurality and/or some other combination of features, structures and/or characteristics. Likewise, the term "based on" and/or similar terms are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and claimed subject matter is not limited to these one or more illustrative examples; however, again, particular context of description and/or usage provides helpful guidance regarding inferences to be drawn.

A network may also include now known, and/or to be later developed arrangements, derivatives, and/or improvements, including, for example, past, present and/or future mass storage, such as network attached storage (NAS), a storage area network (SAN), and/or other forms of computing and/or device readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be substantially compliant and/or substantially compatible with differing protocols, such as network computing and/or network communication protocols (e.g., network protocols), may interoperate within a larger network. In this context, the term sub-network and/or similar terms, if used, for example, with respect to a network, refers to the network and/or a part thereof. Sub-networks may also comprise links, such as physical links, connecting and/or coupling nodes, such as to be capable to communicate signal packets between devices of particular nodes, including via wired links, wireless links, or combinations thereof. Various types of devices, such as network devices and/or computing devices, may be made available so that device interoperability is enabled and/or, in at least some instances, may be transparent to the devices. In this context, the term transparent, if used with respect to devices of a network, refers to the device communicating via the network in which the devices are able to communicate via one or more intermediate devices, such as of one or more intermediate nodes, but without the communicating devices necessarily specifying the one or more intermediate nodes and/or the one or more intermediate devices of the one or more intermediate nodes and/or thus, may include the devices communicating via the one or more intermediate nodes and/or the one or more intermediate devices of the one or more intermediate nodes as if such intermediate nodes and/or intermediate devices are not necessarily involved in such network communication. For example, a router may provide a link and/or connection between otherwise separate and/or independent LANs. In this context, a private network refers to a particular, limited set of devices, such as network devices and/or computing devices, able to communicate with other devices, such as network devices and/or computing devices, in the particular, limited set, such as via signal packet and/or frame communications, for example, without a need for re-routing and/or redirecting communication. A private network may comprise a stand-alone network; however, a private network may also comprise a subset of a larger network, such as, for example, without limitation, all or a portion of the Internet. Thus, for example, a private network "in the cloud" may refer to a private network that comprises a subset of the Internet, for example. Although signal packet and/or frame communications may employ intermediate devices of intermediate nodes to exchange signal packets, those intermediate devices may not necessarily be included in the private network by not being a source or destination for one or more signal packet, for example. It is understood in this context that a private network may provide outgoing network communications to devices not in the private network, but devices outside the private network may not necessarily be able to direct inbound network communications to devices included in the private network.

The Internet refers to a decentralized global network of interoperable networks that comply with the Internet Protocol (IP). It is noted that there are several versions of the Internet Protocol. Here, the term Internet Protocol, IP, and/or similar terms, is intended to refer to any version, now known and/or later developed of the Internet Protocol. The Internet includes local area networks (LANs), wide area networks (WANs), wireless networks, and/or long haul public networks that, for example, may allow signal packets to be communicated between LANs. The term World Wide Web (WWW or Web) and/or similar terms may also be used, although it refers to a part of the Internet that complies with the Hypertext Transfer Protocol (HTTP). For example, network devices may engage in an HTTP session through an exchange of appropriately substantially compatible and/or substantially compliant signal packets. It is noted that there are several versions of the Hypertext Transfer Protocol. Here, the term Hypertext Transfer Protocol, HTTP, and/or similar terms is intended to refer to any version, now known and/or later developed. It is likewise noted that in various places in this document substitution of the term Internet with the term World Wide Web ('Web') may be made without a significant departure in meaning and may, therefore, also be understood in that manner if the statement would remain correct with such a substitution.

Although claimed subject matter is not in particular limited in scope to the Internet and/or to the Web; nonetheless, the Internet and/or the Web may without limitation provide a useful example of an embodiment at least for purposes of illustration. As indicated, the Internet and/or the Web may comprise a worldwide system of interoperable networks, including interoperable devices within those networks. The Internet and/or Web has evolved to a public, self-sustaining facility that may be accessible to tens of millions of people or more worldwide. Also, in an embodiment, and as mentioned above, the terms "WWW" and/or "Web" refer to a part of the Internet that complies with the Hypertext Transfer Protocol. The Internet and/or the Web, therefore, in this context, may comprise a service that organizes stored digital content, such as, for example, text, images, video, etc., through the use of hypermedia, for example. It is noted that a network, such as the Internet and/or Web, may be employed to store files and/or electronic documents. The term file and the term electronic document are used throughout this document in a generic sense to refer to a set of stored memory states and/or a set of physical signals associated in a manner so as to form a file and/or an electronic document. That is, it is not meant to implicitly reference a particular syntax, format and/or approach used with respect to a set of associated memory states and/or a set of associated physical signals. If a particular type of file storage format and/or syntax, for example, is intended, it is referenced expressly herein.

A HyperText Markup Language ("HTML"), for example, may be utilized to specify digital content and/or to specify a format for hypermedia type digital content, such as in the form of a file and/or an electronic document" such as a Web page, website, etc., for example. An Extensible Markup Language ("XML") may also be utilized to specify digital content and/or format of hypermedia type digital content, such as in the form of a file or an electronic document, such as a Web page, website, etc., in an embodiment. Of course, HTML and/or XML are merely examples of "markup" languages, provided as illustrations. Furthermore, HTML and/or XML (and/or similar terms) is intended to refer to any version, now known and/or later developed of these languages. Likewise, claimed subject matter is not intended to be limited to examples provided as illustrations, of course.

As used herein, the term "Web site" and/or similar terms refer to a collection of related Web pages. Also as used herein, "Web page" and/or similar terms refer to any electronic file and/or electronic document, such as may be accessible via a network, including by specifying a uniform resource locator (URL) for accessibility via the Web, in an example embodiment. As alluded to above, in one or more embodiments, a Web page may comprise digital content coded (e.g., via computer instructions) using one or more languages, such as, for example, markup languages, including HTML and/or XML, although claimed subject matter is not limited in scope in this respect. Also, in one or more embodiments, application developers may write code (e.g., computer instructions) in the form of JavaScript, for example, executable by a computing device to provide digital content to populate an electronic document in an appropriate format, such as for an application. The term 'JavaScript' and/or similar terms are intended to refer to any now known and/or later developed version of this programming language. However, JavaScript is merely an example programming language. As was mentioned, claimed subject matter is not intended to be limited to examples and/or illustrations.

As used herein, the terms "entry", "electronic entry", "document", "electronic document", "content", "digital content", "item", and/or similar terms are meant to refer to signals and/or states in a physical format, such as a digital signal and/or digital state format, e.g., that may be perceived by a user if displayed, played and/or otherwise executed by a device, such as a digital device, including, for example, a computing device, but otherwise might not necessarily be readily perceivable by humans (e.g., in a digital format). Likewise, in this context, digital content provided to a user in a form so that the user is able to readily perceive the underlying content itself (e.g., hear audio and/or see images, as examples) is referred to, with respect to the user, as 'consuming' digital content, 'consumption' of digital content, 'consumable' digital content and/or similar terms. For one or more embodiments, an electronic document may comprise a Web page of code (e.g., computer instructions) in a markup language, such as, for example, HTML (hypertext markup language), as previously described, executed or to be executed by a computing and/or networking device, for example. In another embodiment, an electronic document may comprise a portion or a region of a Web page. However, claimed subject matter is not intended to be limited in these respects. Also, for one or more embodiments, an electronic document and/or electronic entry may comprise a number of components. Components in one or more embodiments may comprise text, for example, in the form of physical signals and/or physical states (e.g., capable of being physically displayed). Also, for one or more embodiments, components may comprise a graphical object, such as, for example, an image, such as a digital image, and/or sub-objects, such as attributes thereof, which, again, comprise physical signals and/or physical states (e.g., capable of being physically displayed). In an embodiment, digital content may comprise, for example, text, images, audio, video, and/or other types of electronic documents and/or portions thereof, for example.

Also as used herein, one or more parameters refer to material descriptive of a collection of signal samples, such as one or more electronic documents, and exist in the form of physical signals and/or physical states, such as memory states. For example, one or more parameters, such as referring to an electronic document comprising an image, may include parameters, such as time of day at which an image was captured, latitude and longitude of an image capture device, such as a camera, for example, etc. In another example, one or more parameters relevant to digital content, such as digital content comprising a technical article, may include one or more authors, for example. Claimed subject matter is intended to embrace meaningful, descriptive parameters in any format, so long as the one or more parameters comprise physical signals and/or states, which may include, as parameter examples, name of the collection of signals and/or states (e.g., file identifier name), technique of creation of an electronic document, purpose of an electronic document, time and date of creation of an electronic document, logical path of an electronic document (or portion thereof), coding formats (e.g., type of computer instructions, such as a markup language) and/or other related standards and/or specifications used in order for an electronic document to be substantially compliant and/or substantially compatible, and so forth.

Signal packets, also referred to as signal packet transmissions, may be communicated between nodes of a network, where a node may comprise one or more network devices and/or one or more computing devices, for example. As an illustrative example, but without limitation, a node may comprise one or more sites employing a local network address. Likewise, a device, such as a network device and/or a computing device, may be associated with that node. It is also noted that in the context of this patent application, the term transmission is intended as a generic term for a type of network signal communication (e.g., signal packets), such as a communication made or to be made across a network or across a portion thereof. However, it is not intended to imply a particular directionality of communication and/or a particular initiating end of a communication path for the 'transmission' communication. For example, the mere use of the term in and of itself is not intended herein to provide particular implications with respect to the one or more signals being communicated, such as, for example, whether the signals are being communicated "to" a particular device, whether the signals are being "from" a particular device, and/or regarding which end of a communication path may be initiating communication, such as in a "push type" of signal transfer or in a "pull type" of signal transfer. Thus, a signal packet and/or frame may, as an example, be communicated via a communication channel and/or a communication path, such as comprising a portion of the Internet and/or the Web, from a site via an access node coupled to the Internet or vice-versa. Likewise, a signal packet and/or frame may be forwarded via network nodes to a target site coupled to a local network, for example. A signal packet and/or frame communicated via the Internet and/or the Web, for example, may be routed via a path, either being "pushed" or "pulled," comprising one or more gateways, servers, etc. that may, for example, route a signal packet and/or frame, such as, for example, substantially in accordance with a target and/or destination address and availability of a network path of network nodes to the target and/or destination address.

Although the Internet and/or the Web comprise a network of interoperable networks, not all of those interoperable networks are necessarily available and/or accessible to the public.

In particular implementations, a network communications protocol for communicating between devices may be characterized, at least in part, substantially in accordance with a layered description, such as the so-called Open Systems Interconnection (OSI) seven layer type of approach and/or description. A network computing and/or communications protocol (also referred to as a network protocol) refers to a set of signaling conventions, such as for communication transmissions, for example, as may take place between and/or among devices in a network, typically network devices; for example, devices that substantially comply with the protocol and/or that are substantially compatible with the protocol. In this context, the term "between" and/or similar terms are understood to include "among" if appropriate for the particular usage and vice-versa. Likewise, in this context, the terms "compatible with", "comply with" and/or similar terms are understood to include substantial compliance and/or substantial compatibility.

Typically, a network protocol, such as protocols characterized substantially in accordance with the aforementioned OSI description, has several layers. These layers may be referred to here as a network stack. Various types of communications (e.g., transmissions), such as network communications, may occur across various layers. A lowest level layer in a network stack, such as the so-called physical layer, may characterize how symbols (e.g., bits and/or bytes) are communicated as one or more signals (and/or signal samples) via a physical medium (e.g., twisted pair copper wire, coaxial cable, fiber optic cable, wireless air interface, combinations thereof, etc.). Progressing to higher-level layers in a network protocol stack, additional operations and/or features may be available via engaging in communications that are substantially compatible and/or substantially compliant with a particular network protocol at these higher-level layers. For example, higher-level layers of a network protocol may, for example, affect device permissions, user permissions, etc.

A virtual private network (VPN) may enable a remote device to more securely (e.g., more privately) communicate via a local network. A router may allow network communications in the form of network communications (e.g., signal packets), for example, to occur between a remote device and a VPN server on a local network. A remote device may be authenticated and a VPN server, for example, may create a special route between a local network and the remote device through an intervening router. However, a route may be generated and/or also regenerated if the remote device is power cycled, for example. Also, a VPN is typically understood in this context to affect a single remote device.

A network may be very large, such as comprising thousands of nodes, millions of nodes, billions of nodes, or more, as examples. As mentioned, with networks, such as the Internet, gaining popularity, and with a vast multitude of digital content, such as pages, other electronic documents, other digital media content, and/or applications, becoming available to users, such as via the World Wide Web (hereinafter 'Web'), it may be desirable to provide more efficient and/or more streamlined approaches to gather, organize, store, modify, search, and/or retrieve content, such as digital content, for example. Internet-type business entities, such as Yahoo!, for example, may provide a wide range of digital content storage, search, and/or retrieval services for a wide range of applications, for example. Such digital content storage, search, and/or retrieval services may involve distributed systems, particularly for large amounts of digital content to be accessed, stored, modified, and/or searched, for example, by large numbers of clients (e.g., client computing devices).

In an embodiment, as described in more detail below, it may be convenient to embed digital content, in the form signals and/or signal samples, within signal packets, such as for network type communications, as an example. Claimed subject matter is not limited in scope to a particular content type; however, for ease of illustration, digital video content is provided below as one example of a type of content. For example, digital video content may be streamed across a network. A variety of video streaming protocols are known to exist, such as HLS, to provide an example, which refers to HTTP Live Streaming ("HLS"), first released in May, 2009 by Apple Inc. Thus, as an example, a player, such as a media player, may recognize digital video content, e.g., to perform and/or display, as substantially compatible and/or substantially compliant with a digital video protocol, such as HLS, which, again, in this non-limiting example refers to HTTP Live Streaming ("HLS"). It is noted that in this context the term, HLS, if mentioned herein, is meant to refer to any version, now known or later developed. Likewise, a type of digital content protocol, such as for formatting, signaling, transferring, playing, performing, etc. digital content, such as, in this illustration, digital video content, shall be referred to here for purposes of convenient discussion as a V/C type protocol (referred to as 'type V/C protocol' with signal packets referred to as 'type V/C protocol signal packets'). Here, "V/C" is short for "video content," although the designation could be arbitrary, such as type C, following type A and type B, for example, which are employed below.

In a network computing and/or communications environment, furthermore, a digital video protocol, for example, may be structured (e.g., formatted) to integrate with a network computing and/or communications protocol (e.g., network protocol). Likewise, as alluded to, it may, for example, be substantially compatible and/or substantially compliant with a network computing and/or communications signaling protocol (e.g., network protocol), such as a type A protocol (referred to as 'type A protocol' with signal packets referred to as 'type A protocol signal packets' for convenience). It is noted that digital content, such as type V/C protocol signal packets, may be, for example, but not necessarily, embedded within a payload of a network protocol, such as a type A protocol. For example, type V/C signal packets may be effectively handled generically as signal content (e.g., signal samples), such as within payloads of signal packets that are substantially compliant and/or compatible with a type A protocol. In this illustration, embedded type V/C signal packets, for example, may nonetheless be recoverable from type A signal packets at a point along a network. However, as is known, a variety of network protocols, such as at the Transport layer, currently exist. Thus, if it may be more convenient to employ type B protocol signal packets (another network protocol, here, referred to as 'type B protocol' with signal packets referred to as 'type B protocol signal packets' for convenience) rather than type A protocol signal packets to communicate type V/C signal packets across a network, such as depending at least in part on a particular type of content being communicated (e.g., digital video content in this example) and/or depending at least in part on features of a type A protocol in comparison with features of a type B protocol. For example, for transfer of digital video content, particularly under a variety of possible network conditions, better throughput (e.g., less delay) and/or fewer instances in which some content may be lost (e.g., lost packets) may be desirable. In addition, protocol-specific type of behaviors, such as flow control, congestion control packet pacing, repeated signaling attempts and/or signal packet ordering, as examples, may affect content transfer in a manner so that one network protocol may potentially be better suited than another, as described in more detail below.

Thus, in an embodiment, it may be convenient to convert between network computing and/or communications protocols, such as from a type A protocol to a type B protocol, as shall be described in more detail, before communicating content across a network, in this example, digital video content (e.g., here, as described, type V/C signal packets). However, it is further noted that it is not assumed that a one-to-one relation necessarily is employed even for substantially the same digital content being converted, such as from a type A protocol signal packet to a type B protocol signal packet. In other words, for example, a type A protocol signal packet, as a non-limiting example, such as having a signal packet payload, may be spread, in effect, across multiple type B protocol signal packets. However, embedding of signals and/or signal packets, as described, e.g., of V/C type protocol signal packets, may be performed, in an embodiment. It is further noted, however, that in an implementation, converting from a type A protocol to a type B protocol, for example, it may be convenient to omit some portions of type A protocol signal packets as not necessary in at least some cases. Resources to convert between network protocols, as described later, exist. Furthermore, doing so is within the capabilities of one of ordinary skill in the relevant art and, thus, need not be described in great detail.

As an example, some techniques for transferring digital content, such as digital video content, between computing devices, such as across a computing and/or communications network, may employ a "network-throughput-feedback-type transfer protocol." As utilized herein, the term "network-throughput-feedback-type transfer protocol" refers to a network protocol that employs feedback-type signaling regarding delivery of signal packets communicated across a network to affect throughput of network communications so as to result in network congestion reduction and/or avoidance, such as along the lines of TCP congestion control and/or a TCP-type congestion window, for example. For convenience, a network protocol that includes this latter feature may be referred to as a type A protocol, infra. In an embodiment, a type A protocol may, but is not required to, also provide for re-transfer (e.g., another transfer attempt) of potentially missing (e.g., lost or delayed) signal packets, and/or may, but is not required to, provide for a type of signaling handshake to occur between devices (e.g., computing and/or network devices) to establish a network communication connection. A type A protocol may, but is not required to, also provide for ordered delivery of digital content, such as signal packets, and/or provide for signaling rates, such as bit-rates, that may be adaptable depending at least partially, for example, on network conditions, in an embodiment. Thus, for example, Hypertext Transfer Protocol (HTTP) 1.1, specified in RFC 2616 released January 1997 by the Internet Engineering Taskforce (IETF) comprises an example of a type A protocol. The latter example protocol specifically is based at least in part on transport connection protocol ("TCP"), specified in RFC 793 released in September 1981 by the IETF. In general, in this context, a network protocol based at least in part on TCP comprises a type of network protocol that comprises a type A protocol.

Of course, HTTP and TCP are merely illustrative examples and claimed subject matter is not limited in scope to examples provided for illustrative purposes.

Additionally, as utilized herein, the term "non-network-throughput-feedback-type transfer protocol" refers to a network communications protocol that provides for transfer of digital content via communications (e.g., via signal packets across a network without necessarily employing feedback-type signaling regarding delivery of signal packets communicated across a network to affect throughput of network communications so as to result in network congestion reduction and/or avoidance, such as along the lines of TCP congestion control and/or a TCP-type congestion window, for example. For convenience, a network protocol that includes this latter feature may also be referred to as a type B protocol, infra. For example, a type B protocol may not typically implement acknowledgments as feedback to affect network throughput, in an embodiment. Likewise, in an embodiment, a type B protocol may also provide for transfer of digital content without typically specifying an order of communication (in contrast with an order being specified to play and/or perform transferred content after communication, for example). Also, in an embodiment, a type B protocol may transfer digital content without necessarily first establishing a network communications connection between communicating devices in the network, such as a computing and/or communications network, for example. As an example, a user datagram protocol ("UDP"), specified in RFC 768 and released in August 1980 by the IETF, comprises one example of a type of network protocol that comprises a type B protocol. Of course, again, this is merely an illustrative example and, thus, again, claimed subject matter is not limited in scope to examples provided for illustrative purposes.

As alluded to previously, in a variety of situations, for example, for transfer of digital video content, particularly under a variety of possible network conditions, better throughput (e.g., less delay) and/or fewer instances in which some content is lost (e.g., lost packets) may be desirable. Particularly, a network protocol able to improve throughput and/or reduce loss of content may be desirable for various reasons related to content transfer, such as via a computing and/or communications network. For example, a relatively high fidelity content rendering and/or performance at an end point (e.g., for user consumption), may be presented to an end user with less delay even under a variety of network conditions. In a variety of situations, too much delay may result in an end user, instead of waiting, visiting another web page and/or website, which may be less desirable for various online business situations.

However, digital content transfer via a type A protocol may have some characteristics that may make it more challenging to improve throughput and/or reduce loss of content (e.g., in the form of lost transport layer network signal packets) Previously, HTTP, as an example, was mentioned as being based at least in part on Transmission Control Protocol (TCP). It is noted that in this context the term, HTTP, if mentioned herein, is meant to refer to any version, now known or later developed, as previously mentioned. Likewise, TCP/IP is a protocol involving TCP and the Internet Protocol (IP), as previously mentioned, and is sometimes referred to as the Internet Protocol Suite.

In general, TCP provides a communication service at an intermediate level in a network stack, such as previously described, between an application program level and the Internet Protocol (IP) level. It, in general, provides host-to-host connectivity at the Transport Layer of a network stack.

In TCP, one end of a communication path may provide an acknowledgment ("ACK") to another end of a communication path to indicate successful communication (e.g., transfer), as indicated previously for a type A protocol, for example. In the event of a delayed and/or missing ACK, digital content transfer across the network may, therefore, sharply decrease. A reason is that this may indicate network congestion. Furthermore, failure of an ACK to be communicated, such as after a timeout period, may result in a re-transfer attempt. Waiting for ACKs and/or re-transfer may potentially have an impact on digital content transfer rates that may not be desired, such as a decrease thereof, even if temporary. Thus, user experience may also be affected, for example.

Additionally, for a type A protocol, which may, as mentioned , comprise a type of network protocol based at least in part on TCP, content being transferred may be ordered, such as described previously, so that content may be communicated between devices at respective ends of a network communication path, for example, in a specified order. In the event of loss and/or delay, this potentially may, for example, prolong the time to render content being communicated. Further, as previously alluded to, for a type A protocol, for example, a rate of communication may be decreased in the event of loss and/or delay, such as due to network congestion. For example, if network congestion is detected, such as based at least in part on ACKs, a decrease may result. A decrease in rate of content communication may potentially impact user experience, as previously mentioned. Thus, for at least the reasons mentioned above, employing a type of network protocol that may be based at least in part on TCP, for example, which, as mentioned, comprises a type A protocol, may not be well suited for transfer of digital content of various types, such as in an environment of potentially varying network conditions.

In an embodiment, however, it may be more convenient to employ a type B protocol rather than type A protocol, such as depending at least in part on a particular type of content being communicated and/or depending at least in part on features of a type A protocol in comparison with features of a type B protocol. For example, for transfer of content, in which high throughput may be desirable, particularly under a variety of network conditions, such as conditions that may result in packet loss, one network protocol may be better suited than another.

Thus, in one embodiment, digital content, such as digital video content, as one example, may be communicated across a network, such as at the Transport layer, as an example, using a type A protocol; however, such digital content, for example, instead, may be embedded in signals and/or signal packets in a manner so as to be substantially compliant and/or substantially compatible with a type of network protocol, such as a type B protocol, as was mentioned, but still remain recoverable therefrom so as to provide digital content substantially compliant and/or substantially compatible with a type of protocol, such as a type V/C protocol, at an appropriate point. In an embodiment, for example, digital content may be converted from a signal packet format comprising a plurality of signal packets substantially compatible and/or substantially compliant with a type of network protocol, such as a type A protocol, to a signal packet format comprising a plurality of signal packets substantially compatible and/or substantially compliant with a type of network protocol, such as a type B protocol. It is further noted, however, as previously mentioned, that in an implementation, it may be convenient to omit some portions of type A protocol packets as not necessary if performing such protocol signal packet format conversion, for example.

As discussed previously, examples may include video content formatted to be substantially compatible and/or substantially compliant with HTTP (e.g., a type A protocol) and HLS (e.g., a type V/C protocol), for example. It is, however, noted, again that these are illustrative examples. As previously mentioned, HLS refers to an adaptive streaming protocol that typically may be employed in connection with HTTP, as an example. A variety of other streaming protocols work similarly, such as HTTP Dynamic Streaming (HDS) by Adobe Systems, San Jose, Calif., Smooth Streaming (MSS) by Microsoft Corporation, Redmond, Wash., MPEG Dynamic Adaptive Streaming over HTTP (MPEG-DASH) and/or variants thereof. Thus, rather than HLS, for example, one of these other streaming protocols may be employed, for example, for digital video content. Likewise, claimed subject matter is further not limited in scope to these illustrative examples and/or to digital video content.

In an embodiment, individual signal packets may include signals and/or states comprising a payload, such as digital content, and/or may also include signals and/or states comprising one or more headers, such as source and destination network addresses, for example. To embed digital content, such as video content, for example, to be substantially compliant and/or substantially compatible with a type of network protocol, such as a type B protocol, digital content, initially in the form of type A signal packets, for example, as previously mentioned for this illustrative example, may be partitioned into a plurality of payloads for a respective plurality of signal packets and formatted to be substantially compliant and/or substantially compatible with a type B protocol, for example, in an embodiment. An example may include digital content formatted to be substantially compatible and/or substantially compliant with UDP, for example, as previously mentioned. Likewise, a plurality of type B signal packets may then be communicated across a network, such as a computing and/or communications network, to potentially ameliorate risks of network communication delay, loss of content (e.g., in the form of network transport layer signal packets) and/or other types of network issues, as previously described, for example. It is noted, of course, that video content is provided as an illustrative example. Nonetheless, as mentioned, other types of digital content other than video content are contemplated as being included within claimed subject matter.

Also, as alluded to previously, and explained more fully below, one or more embodiments may at least partially address digital content delay and/or digital content loss, such as for situations transferring digital content via a computing and/or communications network. For example, in an embodiment, digital content may be partitioned into blocks of content, as shall be explained in more detail. Furthermore, as shall also be explained in more detail, for a given block, for example, multiple "slices" of a given block may be communicated in which slices are arranged in a manner so that associated digital content is capable of being constructed and/or re-constructed from communicated slices, even with some amount of loss and/or delay of communicated content, such as one or more omitted slices, for example. Thus, in an embodiment, for example, slices of content, such as for a block, for example, may include some amount of redundancy with respect to associated content, but in a manner well-constructed and/or well-thought out, so that even, for example, if one or more slices are lost or delayed, associated content may still be constructed and/or reconstructed. Thus, in an embodiment, slices for a block of digital content may be communicated across a network so that if one or more slices are lost and/or delayed (e.g., perhaps as a result of signal packet loss and/or delay) and/or communicated out-of-order, a relatively high probability (e.g., greater than 90%, such as 99% in some instances, for example) of being able to construct and/or reconstruct an associated block of digital content, for example, will remain, in an embodiment. In addition to the foregoing, a request for one or more slices, in another attempt to communicate one or more particular slices, for example, that appear to have not been communicated as had been expected, may be made, in an embodiment, also explained in more detail below.

FIG. 1 is a schematic diagram illustrating an example embodiment 100 of a system for communicating digital content across a network, such as a computing and/or communications network. In an embodiment, an example computing device, such as computing device 110, may, for example, comprise a media player, such as digital media content player 112. In an embodiment, a media player, such as digital media content player 112, may comprise a stand-alone media player application, such as iTunes, from Apple, Inc, and/or Windows Media Player, from Microsoft Corporation. Furthermore, in addition or instead, a browser 'plug-in' may include a media player, such as Javascript or Flash implementations of video players, and/or an executable browser may already include computer instructions providing a capability to play and/or perform content, as typically may be done using a media player, to non-exhaustively list a few illustrative examples. Of course, claimed subject matter is not limited in scope to specific examples provided herein. Furthermore, the foregoing examples are, of course, intended to refer to currently existing or future developed versions of these examples.

However, as an example, in an embodiment, media player 112 may be capable of playing and/or performing digital video content in a format comprising a plurality of signal packets substantially compatible and/or substantially compliant with a type of protocol, such as a type V/C protocol. As discussed previously, video content formatted to be substantially compliant and/or substantially compatible with HLS comprises an example, although other non-limiting examples were also previously mentioned. However, while typically, such digital video content may be communicated across a network using a type A protocol, such as HTTP, instead, digital video content, substantially compliant and/or substantially compatible with a type V/C protocol, may be converted from being in a signal packet format substantially compatible or substantially compliant a type A protocol to a signal packet format substantially compatible or substantially compliant with a type B protocol, for communication across a network, as previously described.

Additionally, in an embodiment, an example computing device, such as computing device 110, may store computer instructions executable to transfer and/or process digital content. Executable computer instructions, such as stored at 118, may comprise a software development kit (SDK) library for mobile video applications, such as VXG Video Player SDK available from Video Experts Group, for example, although claimed subject matter is not limited in scope in these respects. Thus, in an embodiment, computing device 110 may store executable computer instructions to process digital content, such as digital video content, for example, in which the digital video content has been partitioned and formatted into a plurality of signal packets substantially compatible and/or substantially compliant with a type of network protocol, such as a type B protocol. In an embodiment, for example, UDP may comprise a type of network protocol like a type B protocol, as previously discussed. For example, block 116, shown in FIG. 1, may comprise executable computer instructions stored in memory of computing device 110 and executable by a processor of computing device 110 to process signal packets substantially compatible and/or substantially compliant with a type B protocol, such as UDP, as an example.

As previously mentioned, in an embodiment, individual signal packets formatted to be substantially compatible and/or substantially compliant with a type B protocol, for example, may include signals and/or states comprising a signal packet payload, such as digital content, and/or may also include signals and/or states comprising one or more headers, for example, such as source and destination network addresses, for example, as previously mentioned. Thus, block 116 may include computer instructions to process signal packets, such as signal packets substantially compatible and/or substantially compliant with UDP, to recover embedded signal packets substantially compatible and/or substantially compliant with a V/C protocol, such as HLS. Thus, in this example, block 116 may, for example, transform UDP signal packets into HLS segments. Likewise, block 114, shown in FIG. 1, may comprise executable instructions stored in memory of computing device 110 and executable by a processor of computing device 110 to process signal packets that were embedded in signal packets substantially compatible and/or substantially compliant with UDP and have been recovered, such as by block 116, as just described. Thus, block 114, for example, in an embodiment, may store executable computer instructions so that digital video content may be streamed for display and/or performance by a media player, such as by a media player, such as 112, for example. In an embodiment, for example, block 114 digital video content may be streamed as it becomes available, block by block, as later described, rather than delaying until a complete segment is available to be streamed. Although typically digital video content may be streamed to player 112 (e.g., push content), it is noted, of course, that player 112 may, instead, seek digital video content as it becomes available (e.g., pull content).

In an embodiment, a media player, such as digital media content player 112, may make a content request, such as one content request or multiple content requests. For example, one or more requests, such as 113, may be communicated between a media player, such as digital media content player 112, and an application to transfer digital content, such as stored at 118 in the form of executable computer instructions, as described above. In an embodiment, one or more requests for digital content may be communicated. For example, in an embodiment, computing device 110 may, via executing instructions, generate one or more requests for digital content, the requests to be communicated across a network, such as between computing device 110 and computing device 120, for example. In an embodiment, one or more requests may include, for example, an identifier of digital content in the form of a uniform resource locator (URL), one or more headers and/or even query parameters, in an embodiment, to assist in identification of particular digital video content, for example. Also, although not a requirement, in an embodiment, generated requests may be substantially compatible and/or substantially compliant with a type of network protocol, such as a type B protocol. However, alternatively, generated requests may be substantially compatible and/or substantially compliant with a type of network protocol, such as a type A protocol, for example, to be converted to signal packets substantially compatible and/or substantially compliant with a type of network protocol, such as a type B protocol.

Further, in an embodiment, computing device 110 may, via execution of computer instructions on a processor of the device (e.g., computer instructions fetched from a memory of the device for execution by the processor), for example, generate one or more vectors for use in linear network coding (and/or decoding), for example. It is worth noting, however, that claimed subject matter is not limited in scope to employing linear network coding. A host of other approaches are possible and intended to be included within claimed subject matter. As examples, Raptor codes and/or employing coding via use of an XOR operation, for example, may be employed. However, continuing with linear network coding as an example, in an embodiment, vectors for linear network coding/decoding may comprise signals and/or states included in one or more content requests. It is further noted that the term "vector" is used in this context in a logical sense, and, thus, if stored, for example, refers to one or more signals and/or states, stored in a memory, such as a memory of a device, such as 110 and/or 120, in an embodiment. Thus, although signal and/or state components of one or more vectors are to be associated logically, storage of components for a particular vector, for example, may be in one or more different places in a physical memory, in an embodiment.

As indicated above, for an embodiment, one or more vectors may be included in one or more requests along with a URL and/or one or more headers, for example, although, again, claimed subject matter is not limited in scope in these respects. For example, in another embodiment, vectors for use in linear coding and/or decoding may be generated elsewhere, such as at the other end of a network communications path, as an example. As explained more fully below, one or more vectors may be utilized at least in part to construct and/or reconstruct digital content (e.g., decoding), such as from one or more slices, for example.

In an embodiment, however, continuing with the present example, one or more requests may be processed at a computing device, such as computing device 120. One or more requests may include one or more headers and/or URL, and/or may include one or more vectors for use in linear network coding (and/or decoding), as previously discussed. Thus, in an embodiment, computing device 120, via execution of stored computer instructions, such as stored at 124, for example, may process one or more requests for digital content.

Computing device 120 may process one or more requests for digital content, for example, at least in part by retrieving digital content. Digital content may be retrieved a variety of ways and claimed subject matter is not intended to be limited to a particular technique or approach. For example, as typically may occur, remote servers may store digital content that is capable of being communicated via a network (e.g., a computing and/or communications network), such as via a "pull" type transfer, in which, a computing device, such as 120, for example, may, in effect, use signaling via the network to "pull" the digital content to a local memory, via network communications, for example, and/or, such as via a "push" type transfer in which a remote server may, in effect, use signaling via the network to "push" the digital content to a local memory of computing device 120, again, via network communications, in an embodiment. References to digital content 130 and/or digital content stored at 130 are understood as including such an approach. Thus, digital content storage 130 may, for example, comprise a third-party server or another content service and, as previously described, digital content may be retrieved via a push-type communication or a pull-type communication.

Device 120 may process stored digital content to be substantially compatible and/or substantially compliant with a type of network protocol, such as a type A protocol. As mentioned, an example includes HTTP. Furthermore, digital video content may be substantially compliant and/or substantially compatible with a type V/C protocol, such as HLS, as mentioned, although other examples, of course exist, such as MPEG-DASH, as also previously mentioned. Thus, in an embodiment, for example, digital content may be partitioned and formatted to be substantially compatible and/or substantially compliant with a type of network communications protocol, such as a type A protocol.

Of course, a variety of possibilities exist and claimed subject matter is intended to include them. For example, in an embodiment, digital video content, as an example, may be stored after already having been partitioned and formatted, so that it may be retrieved and need not be processed by block 124, for example, in the manner just described. In still another embodiment, HTTP processing may be omitted in some cases for simplification and/or streamlining. Rather, a media player may, in an embodiment, include a variety of support options, such as HTTP and/or HTTPS (known as HTTP Secure), for example, and/or perhaps others. Thus, in an embodiment, a media player, for example, may specify a particular option or set of options in one or more content requests.

However, continuing with the present example, in an embodiment, as was mentioned, individual signal packets may include signals and/or states comprising a signal packet payload, such as digital video content substantially compliant and/or substantially compatible with a type of V/C protocol, such as HLS. Likewise, such signal packets may be processed and formatted, as described above, by block 124, for example, for communication via a network to be substantially compatible and/or compliant with a type A protocol, such as HTTP, as an example. However, in an embodiment, block 122 may store executable computer instructions to convert embedded video digital content, such as substantially compliant and/or substantially compatible with a type of V/C protocol, initially in the form of type A protocol signal packets, for example, as previously mentioned, to be substantially compliant and/or compatible with, instead, type B protocol signal packets. Block 122 may likewise store executable computer instructions to convert signal packets, initially in the form of type B protocol signal packets to be substantially compliant and/or compatible with type A protocol signal packets. For example, a UDP request for content may be converted to an HTTP request that may be associated with HLS compliant and/or compatible digital video content, for example, with the video content to then be partitioned and formatted, by block 122, in this embodiment, for example, for communication in the form of type B protocol signal packets.

Thus, digital content, such as video content, although partitioned and formatted to be substantially compatible and/or substantially compliant with a type of network protocol, such as a type A protocol, may further be partitioned and formatted into a plurality of signal packets substantially compatible and/or substantially compliant with a type of network protocol, such as a type B protocol. An example may include digital content formatted for UDP, for example, as previously mentioned. Likewise, a plurality of type B signal packets may then be communicated across a network, such as a computing and/or communications network, to potentially ameliorate risks of network communication delay, loss of content (e.g., in the form of network transport layer signal packets) and/or other types of network issues, as previously described, for example. It is noted, of course, that digital video content is provided as an illustrative example. Nonetheless, as mentioned, other types of digital content other than video content are contemplated as being included within claimed subject matter.

Although computing device 120 and computing device 110 are respectfully depicted in FIG. 1 as a single device, respectively, embodiments in accordance with claimed subject matter may comprise a number of computing devices. For example, one or more requests may be communicated between a computing device, such as computing device 110, and a plurality of computing devices, such as computing devices 120, as one example. In an embodiment, a computing device, such as computing device 110, may, for example, partition content requests among multiple computing devices. In an embodiment, for example, communication among multiple individual computing devices, such as computing devices 120, and a computing device, such as computing device 110, may further reduce risk of content being lost and/or delayed. Of course, claimed subject matter is not limited in scope to employing the foregoing approach, which is merely an illustration.

Figure 2:
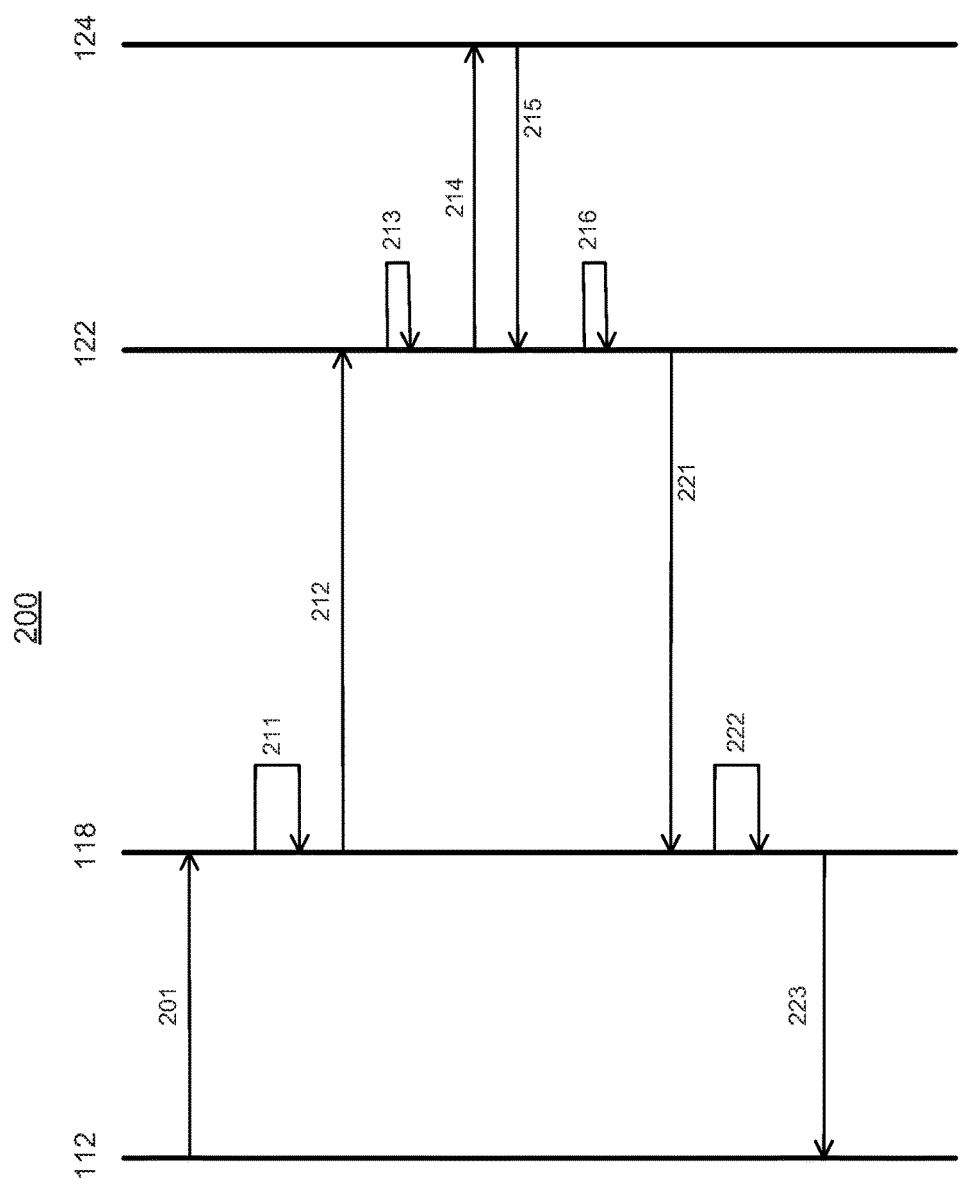
FIG. 2 is a schematic diagram that depicts an example of communications between computing devices of a network, in accordance with an embodiment.

FIG. 2 is an example schematic diagram 200 depicting example network communications for an embodiment. For example, a media player, such as 112 of computing device 110, may communicate one or more requests 201. For example, one or more requests 201 may be made between digital media content player 112 and block 118, depicting stored executable computer instructions, as previously described. Thus, in an embodiment, based at least in part on one or more requests 201, one or more requests 211, as indicated, may be generated and may include, for example, an identifier of digital content in the form of a uniform resource locator (URL) and/or in the form of one or more headers, as an example, as previously described.

In an embodiment, one or more requests 211 may identify particular digital content. In an embodiment, requests 211 may further include one or more vectors and/or matrices that may be utilized, for example, by a computing device, such as computing device 120, in connection with linear network coding and/or another type of coding, as explained more fully below, although claimed subject matter is not limited in scope in these respects.

In an embodiment, "matrices" may comprise signals and/or states. Thus, it is noted that the terms "matrix" and/or "matrices" are used in this context in a logical sense, and, if stored, for example, refer to one or more signals and/or states, for example, stored in a memory, such as a memory of a device, such as 110 and/or 120, in an embodiment. Thus, although signal and/or state components are to be associated logically, as shall be described further, storage of components for a particular matrix, for example, may be in one or more different places in a physical memory, in an embodiment.

As depicted in FIG. 2, requests, now 212, having been processed to include signals and or states, as described above, in an embodiment, may be communicated between a computing device, such as 110, and a computing device, such as 120, such as via a computing and/or communications network. In an embodiment, a computing device, such as computing device 120, may execute instructions, such as stored at 122, to process one or more requests 212. As mentioned, one or more vectors may be included in one or more requests, such as requests 212, in an embodiment. Also, in an embodiment, requests 212, may include digital content in the form of a URL and/or one or more headers, for example, to identify particular digital content to be performed and/or displayed, such as by a media player, such as digital media content player 112, for example.

Therefore, in an embodiment, a computing device, such as computing device 120, may, via execution of instructions, such as stored at 122, identify one or more requests for particular content, such as 213, from the one or more requests 212. For example, computing device 120 may, via execution of instructions, such as stored at 122, perhaps extract initial request 201 for digital content to be played and/or performed by media player 112, if included within the request in an extractible form, although claimed subject matter is not limited in scope to such an embodiment. Additionally, computing device 120 may, via execution of instructions, such as stored at 122, initiate a request 214 for identified digital content, such as digital content identified by one or more requests 212, as previously described. In an embodiment, for example, identified content may be stored, such as at digital content storage 130. Of course, digital content storage 130 may comprise digital content stored at remote servers, for example. Thus, digital content may be locally cached from other remote servers or proxies, in an embodiment. Claimed subject matter is not intended to be limited in scope to a particular mechanism for retrieving identified digital content, since a variety of approaches are possible. Rather, in an embodiment, computing device 120 may, via execution of instructions, such as stored at 124, be responsive to one or more requests for digital content.

It is noted that with respect to stored digital content, such as digital content storage 130 of FIG. 1, as an example, a variety of possibilities may exist and claimed subject matter is not intended to be limited to examples described primarily for purposes of illustration. However, as one example, stored digital content may be processed, such as by executable instructions stored at 124, so as to be partitioned and formatted to be substantially compatible and/or substantially compliant with a network protocol. Thus, digital content 215, as shown in FIG. 2, may be processed. Stored digital video content may be processed to be substantially compatible and/or substantially compliant with a type of network protocol comprising a type A protocol, for example, as previously described.

Likewise, digital content stored at 130, which as mentioned previously, may comprise remote server storage, may have previously been partitioned and formatted and may be stored in a form already substantially compatible and/or substantially compliant with a type of network protocol comprising a type A protocol, also previously described. Thus, as previously mentioned, in an embodiment, digital video content, as an example, may be stored after having been partitioned and formatted, for example. In still another embodiment, as also previously mentioned, HTTP processing may be omitted in some cases for simplification and/or streamlining. Rather, as mentioned above, a media player may, in an embodiment, include a variety of support options, such as HTTP and/or HTTPS (known as HTTP Secure), for example, and/or perhaps others. Thus, in an embodiment, a media player, for example, may specify a particular option or set of options in one or more content requests.

Regardless, in an embodiment, digital content, such as digital content 215, such as digital video content, as one example, may be substantially compliant and/or substantially compatible with a type of network protocol, such as a type A protocol; however, it may be desirable to have such digital content, for example, embedded in signals and/or signal packets in a manner so as to be substantially compliant and/or substantially compatible with a type of network protocol, such as a type B protocol, as was mentioned, but still remain recoverable therefrom so as to provide digital content substantially compliant and/or substantially compatible with a V/C type of protocol, at an appropriate point.

In an embodiment, a computing device, such as computing device 120, may, via execution of instructions, such as stored at 122, generate content 216 to be substantially compliant and/or substantially compatible with a type of network protocol, such as a type B protocol, for example. In an embodiment, a computing device, such as computing device 120, may, via execution of instructions such as stored at 122, partition and format digital content 215, for example.

In an embodiment, digital content 215 may be partitioned into a plurality of blocks configurable and/or selectable (e.g., user selectable) size. Also, in an embodiment, a last block of a sequence of blocks may be padded, such as with zeros, such as for size consistency. An example block may comprise several tens of kilobytes in size, in an embodiment.

Further, as alluded to previously, multiple slices may be generated from a block of digital content in an embodiment. A "slice" may comprise digital content that is to be communicated between computing devices, such as between computing device 120 and computing device 110, such as via a computing and/or communications network. In an embodiment, slices may comprise transmission unit (TU)-sized portions of content (e.g., typically less than maximum transmission sized units (MTU) to account for protocol overhead signals so that a slice with overhead may comprise an MTU), that may be generated at least in part by subjecting content to one or more coding techniques, such as linear network coding, as explained in more detail below. Thus, in an embodiment, computing device 120 may, via execution of instructions, such as stored at 122, generate one or more signal packets, such as 221, to be communicated between computing devices, such as computing device 120 and computing device 110, for example. In an embodiment, although claimed subject matter is not limited in scope in this respect, 221 may comprise digital content to communicate slices in a form substantially compatible and/or substantially compliant with a type of network protocol, such as a type B protocol.

In an embodiment, via network communications, digital content 221 may be communicated across a network between devices, such as 110 and 120, for example, in the form of signal packets. Likewise, via execution of instructions, such as stored at 116, computing device 110 may recover embedded digital content, such as depicted in FIG. 2 as 222. Also, in an embodiment, computing device 110 may, via execution of instructions, such as stored at 118, in this illustration, recover from type B signal packets, embedded type V/C signal packets. Likewise, digital content may be assembled for delivery, which may include display and/or performance, for example, such as depicted in FIG. 2 as 223, as previously described.

FIG. 2 depicts various communications and/or operations that may be performed in parallel, such as substantially concurrently, with one or more computing devices, such as computing devices 110 and/or 120, in an embodiment. For example, computing device 110 may, via execution of instructions, such as stored at 118, generate multiple requests, as indicated at 211. In an embodiment, multiple requests at 211 in FIG. 2, for example, may be communicated between computing device 110 and multiple computing devices, such as computing devices 120. Further, digital content may be communicated between multiple computing devices, such as 120, and a computing device, such as 110.

In an embodiment, digital content may be communicated between individual computing devices of the multiple computing devices 120 and computing device 110, as previously described, for example, to potentially further reduce risk of loss and/or delay of digital content in an embodiment.

As mentioned previously, one or more computing devices, such as computing device 120, may use linear network coding techniques and/or other coding techniques, for example, to create slices from blocks of content, in an embodiment. Thus, in an embodiment, a computing device, such as computing device 110, may, via execution of instructions, such as stored at 116, construct and/or reconstruct blocks of content even if one or more slices are missing and/or delayed, and/or whether one or more slices are communicated out-of-order, for example.

As mentioned, digital content may be partitioned into blocks in an embodiment. For example, one or more computing devices may partition digital content, for example, into a plurality of blocks. Individual blocks may comprise a matrix of values having N rows and M columns, for example, in which values for the M columns have a size less than an MTU (as previously indicated), and in which N is configurable and/or selectable, such as user-selectable, and/or determines block size, although this is merely an illustrative embodiment. Thus, claimed subject matter is not limited in scope in this respect.

In an embodiment, to generate an individual slice, an N×M matrix may be multiplied, via matrix multiplication, by a 1×N vector, resulting in an M×1 slice vector. In an embodiment, a 1×N vector may be generated by a computing device, as previously alluded and described in more detail below. As suggested, either end of a communications path may potentially provide a vector for use in generating a slice, such as at computing device 110 or computing device 120, or a vector may likewise be produced elsewhere. Nonetheless, for this particular embodiment, without limitation, for example, a vector may be generated at computing device 110, such as, for example, via execution of stored computer instructions, such as stored at 116, for example. In an embodiment, N+K vectors to be communicated may be produced. In an embodiment, K≥0. N comprises a value indicating a number of slices to construct and/or reconstruct an associated block. K comprises a value to at least partially compensate for risk of potential digital content loss and/or potential digital content delay, such as loss and/or delay of one or more slices.

Thus, in an embodiment, N+K slices may be communicated between computing devices, such as computing device 120 and computing device 110, such as via a computing and/or communications network. Likewise, in an embodiment, a computing device, such as computing device 110, may, via execution of instructions, such as stored at 116, select a value for K sufficiently large to at least partially compensate for estimated potential digital content delays and/or potential digital content losses, such that with a relatively high probability (e.g., greater than 90%, such as 99% in some instances, for example), at least N slices is reasonably likely to be communicated between computing devices, such as computing device 120 and computing device 110, for a given block of digital content, for example. Although claimed subject matter is not limited in scope in this respect, it is noted that devices, such as 110 and/or 120, as examples, may also track prior communications to estimate potential digital content loss and/or digital content delay, in an embodiment. Thus, in an embodiment, substantially dynamically, adjustment may be made for potential digital content loss and/or delay, as explained in more detail below.

For example, for N=30, communicating 32 slices (e.g., K=2) between computing devices, such as computing device 120 and computing device 110, may be employed to at least potentially address a 6.25% packet loss (e.g., 2 out of 32 packets) at 6.67% overhead (e.g., 2 extra slices from an original 30 slices). In an embodiment, at least in part in response to N slices becoming available at a computing device, such as computing device 110, a computing device may, via execution of computer instructions, such as stored at 116, construct and/or reconstruct digital content, for example, at least in part by multiplying a matrix of N slices with an inverse of a matrix of vectors, as described in more detail below. Thus, a matrix of vectors may desirably be chosen to be invertible, also described in more detail below.

Furthermore, in an embodiment, in the event that less than N slices are communicated, additional slices to request to construct and/or reconstruct a block of digital content may be determined. A computing device, such as computing device 110, for example, may, such as via execution of computer instructions, such as stored at 116, request D+M slices, such as from computing device 120, in an embodiment. Thus, D+M slices may be requested in an embodiment to at least partially compensate for potential digital content losses and/or potential digital content delays that may result in less than N slices being communicated. In a similar process as used previously to generate vectors, additional vectors may be generated in a manner so that if D additional slices are communicated, such as without being lost and/or delayed, for example, content missing as a result of a loss or delayed slices is substantially addressed. Likewise, M may be chosen to dynamically adjust (e.g., at least partially compensate) for potential packet loss and/or delay, as suggested previously with respect to K for N+K slices. It is likewise noted that communication of additional slices, if done in parallel, for example, should not substantially impact throughput. Alternate routes through the network are likely to be employed. However, in contrast, for approaches that employ a type A protocol, for example, throughput would likely to be adversely impacted by a request for additional content, as was described.

Figure 5:
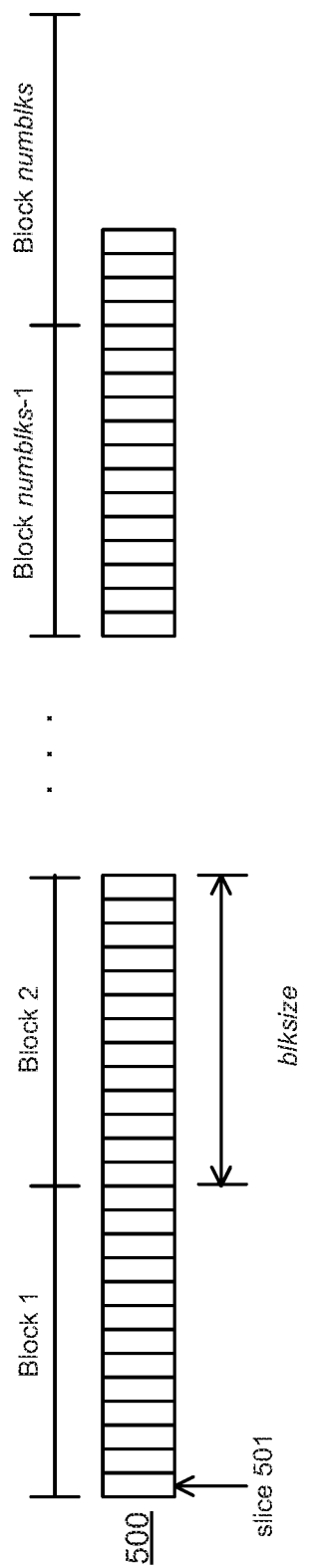
FIG. 5 is a schematic diagram that depicts an illustration of example partitioning of digital content for packetized-type communications via a network, in accordance with an embodiment.

FIG. 5 depicts an illustration of example digital content 500 partitioned into a plurality of blocks, such as blocks labeled 1 through numblks, for example. As mentioned, digital content, such as digital content to be transferred via a network, may be partitioned into a sequence of blocks. In an embodiment, a block length, denoted as blksize in FIG. 5, may comprise a multiple of a slice size. For example, blocks of digital content, such as blocks 500, may comprise a plurality of slices, such as slice 501. In an embodiment, size of a particular digital content object might not comprise an integer multiple of a block size. Thus, a last block may be padded, such as with zeros, such as for size consistency. In an embodiment, a number of slices (coeffsize) may relate a slice size to a block size substantially in accordance with an example relation (1):

$$blksize = coeffsize * slice\ size \quad (1)$$

In an embodiment, a slice, such as described above, may comprise a packet of digital content to be communicated. In an embodiment, a slice may include processed or coded digital content, a vector used to generate the processed content, and a block number identifying a particular block with which a slice may be associated. Below, the term "free vector" is used to refer to processed digital content. For example, as mentioned, linear network coding may be employed in an embodiment; however, as mentioned, other approaches may be employed.

An example block may comprise a matrix of bytes of size 1250*coeffsize, as shown:

$$\begin{bmatrix} Block[0], \ldots Block[coeffsize-1] \\ Block[coeffsize], \ldots, Block[2*coeffsize-1] \\ \vdots \\ Block[1249*coeffsize], \ldots, Block[1250*coeffsize-1] \end{bmatrix}$$

wherein Block[i] represents an $i^{th}$ byte of a block, in an embodiment. In an embodiment, a free vector may comprise an operation, here matrix multiplication, employed for a block matrix and for a vector used for coding. In an embodiment, computational complexity may be reduced by using binary values in which the presence of binary ones may be relatively sparse. For example, matrix multiplication may be implemented using register shift and register addition operations. Thus, a resulting free vector may comprise a summation of columns in a block matrix having corresponding values of "1" in appropriate locations. For example, if a vector comprises (1,1,0,0, . . . , 0), a resulting free vector may be computed in an example relation (2) substantially in accordance with the following, for an embodiment:

$$\text{free vector} = \begin{bmatrix} Block[0] \\ Block[coeffsize] \\ \vdots \\ Block[1249*coeffsize] \end{bmatrix} + \begin{bmatrix} Block[1] \\ Block[coeffsize+1] \\ \vdots \\ Block[1249*coeffsize+1] \end{bmatrix} \quad (2)$$

It is, likewise, noted that relation (2) above, and other relations below, may be implemented as an XOR operation over a Galois field for further reduction in complexity of computation, for an embodiment; however, for purposes of discussion, the operations are described here in terms of matrix operations without loss of generality and/or comprehension.

More generally, in an embodiment, a FreeVectorMatrix comprising a plurality of free vectors for a plurality of respective slices of a block of content may be encoded substantially according to an example relation (3):

FreeVectorMatrix=BlockMatrix*VectorMatrix (3)

wherein BlockMatrix comprises a block of digital content and VectorMatrix comprises a plurality of vectors corresponding to a respective plurality of slices of the block of content, for example.

Additionally, in an embodiment, a block of digital content, BlockMatrix above, may be decoded at least in part by multiplying FreeVectorMatrix by an inverse of VectorMatrix, substantially according to an example relation (4):

BlockMatrix=FreeVectorMatrix*(VectorMatrix)$^{-1}$ (4)

VectorMatrix is known to be invertible by a selection of linearly independent vectors, as described below.

For example, in an embodiment, a first coeffsize+1 amount of non-randomly generated vectors may be linearly independent. In this manner, a computing device may generate a block of content from a coeffsize amount of slices. In an embodiment, it is intended that an order of slices and/or a particular coeffsize amount of slices to be communicated not significantly impact construction and/or reconstruction of a block of digital content in an embodiment, as a result of employing network linear coding and binary values, for example.

In an embodiment, a computing device, such as computing device 110, may, via execution of instructions, such as stored at 116, generate a set of vectors at least in part by generating a first two vectors having a form of (1,0,0, . . . , 0) and (0,0, . . . , 1), so that the first and last coefficients, respectively, have a value of "1". Also, in an embodiment, a next coeffsize+1 vectors to be generated may have a form of (1,1,0,0, . . . , 0), (0,1,1,0,0, . . . , 0), . . . , (0,0,0, . . . , 1,1) so that for various vectors two sequential components have a value of "1", shifted from the first two vectors to the last pair of vectors over the set of vectors, for example. Additional vectors may be generated randomly, in an embodiment, again, using binary values. Of course, claimed subject matter is not limited in scope to illustrative examples, such as the foregoing.

In an embodiment, a computing device, such as computing device 110, may, via execution of instructions, such as stored at 116, calculate a number of slices per block to at least partially compensate for potential content loss and/or delay, substantially in accordance with an example relation (5):

slices=ceil((1+packet_loss)*coeffsize) (2)

For example, if coeffsize is 30, and if packet_loss is assumed and/or determined to be 0.062 (6.2%), then #slices=32, in an embodiment. In an embodiment, a "ceil" or "ceiling" function may map a real number to a smallest following integer, for example. Thus, coding, in this particular example, linear network coding, is employed to at least partially compensate for potential content loss and/or delay that may occur from communication via a network by adding some amount of redundancy, but in a manner that may be more effective and/or more efficient than simply communicating a block of content across a network multiple times, for example.

For an example in which coeffsize=5 and packet_loss=35%, an amount of slices may be calculated substantially according to example relation 5, recited above, which, for this example, yields #slices=7, in an embodiment. For example, a set of coefficient vectors may comprise (1,0,0,0,0), (0,0,0,0,1), (1,1,0,0,0), (0,1,1,0,0), (0,0,1,1,0), (0,0,0,1,1), (1,0,1,0,1), in an embodiment. Of course, claimed subject matter is not limited in scope to these specific examples.

Thus, to generate a slice, as an example, let coeffsize=10, blksize=12,500 (10*1,250), and let a particular example slice be associated with a block identified as block "3. " An example slice may include a block number, such as block number 3, a vector for coding, such as vector (1,1,0,0,0,0, 0,0,0,0), and a free vector, such as a free vector comprising (block[0 . . . 1249]) Xor (block[1250 . . . 2499]), in an embodiment in which a Galois field implementation, as previously described, is used. In an embodiment, therefore, a slice may comprise 1500 bytes, for example, which may include a free vector size of 1250 bytes with 250 bytes for additional content, such as for a coding vector and/or a block number, for a given slice, for example, as was illustrated, although, again, claimed subject matter is not limited in scope in these respects, of course.

As discussed above, embodiments may at least partially address a risk of potential content loss and/or content delay in digital content transfer operations at least in part. In particular, in an embodiment, for example, potential for loss and/or delay of content may be at least partially compensated, such as via coding, as described, so that loss and/or delay of content, if it occurs, may not necessarily hinder an ability to generate an associated block of content, for example. In an embodiment, content may be partitioned into blocks, and individual blocks may be encoded at a computing device, such as computing device 120, to generate slices substantially in accordance with one or more vectors, such as may be generated by a computing device, such as computing device 110. Slices may be communicated between computing devices of a network, such as computing device 120 and computing device 110, in an embodiment. Even if one or more slices are lost and/or delayed and/or communicated out-of-order, a computing device may have a relatively high probability of accurately constructing and/or reconstructing communicated blocks of digital content, in an embodiment. Furthermore, some amount of dynamic compensation may at least partially be employed, such as by tracking content delay and/or content loss in connection with communications that have previously taken place. Thus, parameters employed may be dynamically adjusted (e.g., dynamically computed) to compensate for potential loss and/or delay, in connection with use of relation (5), in an embodiment. For example, a computing device, such as computing device 110, may, via execution of instructions, such as stored at 116, dynamically (e.g., frequently, intermittently and/or periodically) adjust one or more parameters, such as, for example, a coeffsize parameter and/or a packet_loss parameter, such as used above connection with example relation 5, for example, to account for potential variation in network conditions, such as a variation in a level of congestion.

Further, in an embodiment, in the event of missing and/or delayed slices such that a computing device is not able to fully decode a communicated block of digital content, a computing device, such as computing device 110, may request additional slices, in an embodiment, as was described. Furthermore, in an embodiment, those slices lost and/or delay may be readily apparent so that those slices may be particularly requested in an embodiment.

Figure 3:
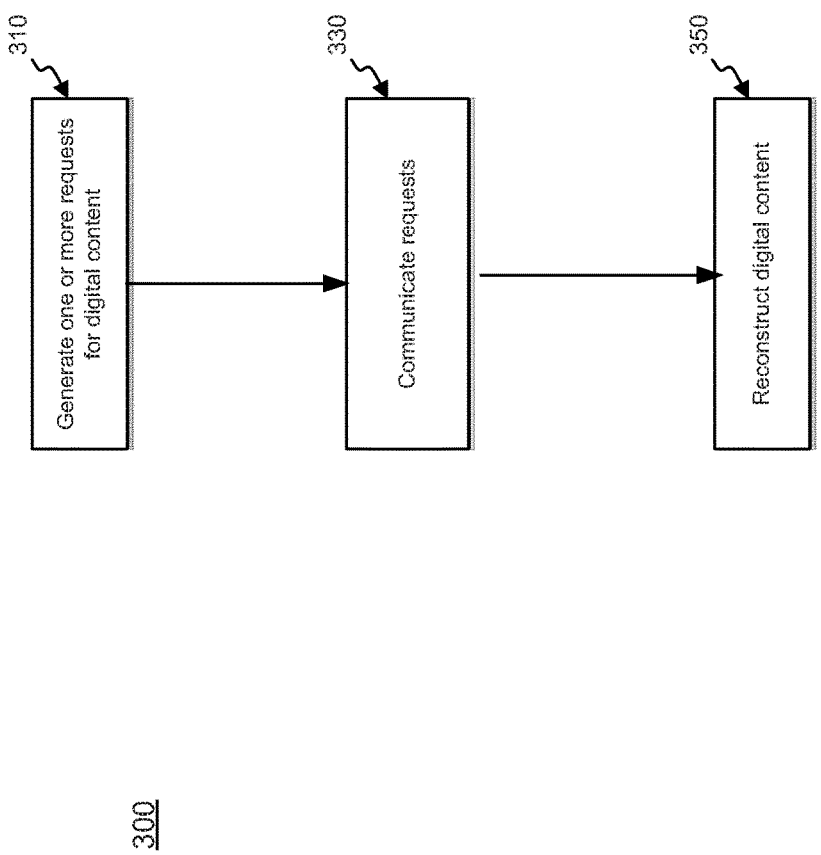
FIG. 3 is a flow diagram illustrating an example process for a computing device engaging in network communications, in accordance with an embodiment.

FIG. 3 is a flow diagram illustrating an embodiment 300 of an example process for communicating digital content across a network, in an embodiment. For example process 300, operations that may be performed by a computing device, such as computing device 110, are described. Although example process 300 is depicted as including blocks 310-350, other embodiments may include more than blocks 310-350 or less than blocks 310-350. Also, the order of blocks 310-350 depicted in example process 300 is merely an example order, and claimed subject matter is not limited in scope in this respect.

As indicated at block 310, a request for digital content may be generated. In an embodiment, a computing device, such as computing device 110, may, via execution of instructions, such as stored at 116, generate one or more requests. Likewise, requests may be substantially compliant and/or compatible with a network protocol, for example. Thus, one or more requests may be communicated across a network, as depicted by block 330. This may be a pull-type of communication or a push-type of communication, for example.

Figure 4:
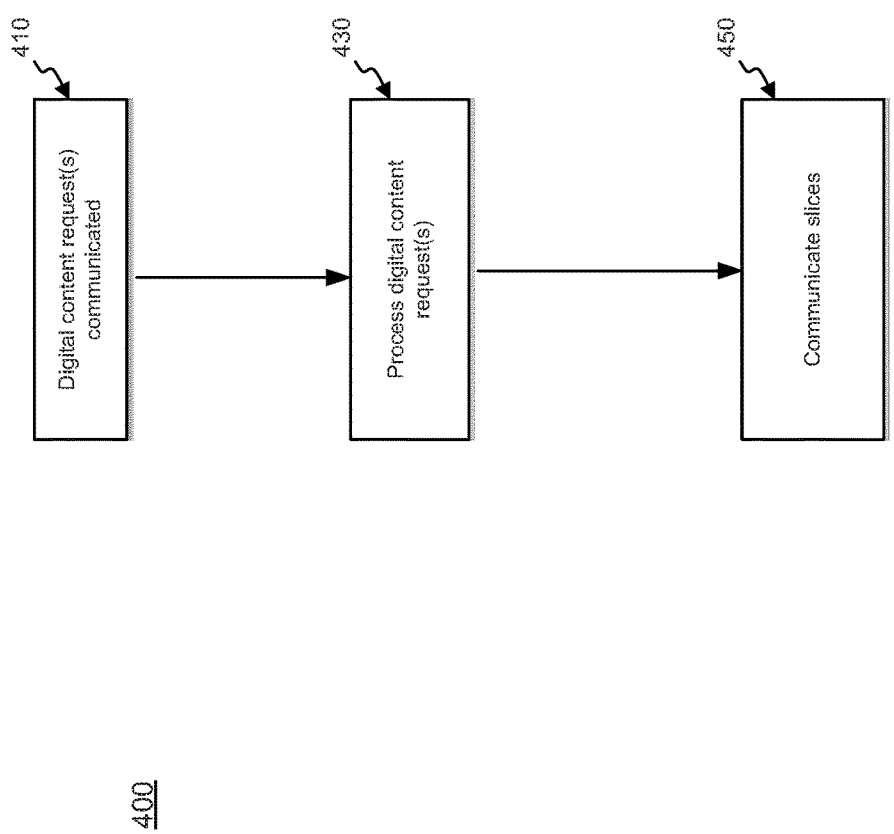
FIG. 4 is a flow diagram illustrating another example process for another computing device engaging in network communications, in accordance with an embodiment.

Additionally, in an embodiment, one or more slices may be communicated between devices, such as in a pull-type communication or in a push-type communication, for example, as shown in FIG. 4, device 120 may generate slices for communication, in an embodiment. Block 350 indicates that digital content may be constructed and/or reconstructed at least in part from the one or more slices, in an embodiment. Further, although not shown, constructed and/or reconstructed digital content may be provided, such as to a media player, such as digital media content player 112, for example.

FIG. 4 is another flow diagram, here, illustrating an embodiment 400 of an example process for communicating digital content across a network, in an embodiment. For example process 400, operations that may be performed by a computing device, such as computing device 120, are described. Although example process 400 is depicted as including blocks 410-450, other embodiments may include more than blocks 410-450 or less than blocks 410-450. Also, the order of blocks 410-450 depicted in example process 400 is merely an example order, and claimed subject matter is not limited in scope in this respect.

As indicated at block 410, one or more requests, such as one or more requests for digital content, may be communicated, in an embodiment. Again, this may comprise a push-type communication or a pull-type communication. As additionally indicated at block 430, the one or more requests may be processed by a computing device, such as computing device 120. For example, as was described, digital content from a digital content store, such as digital content storage 130, for example, may be communicated. Again, this may comprise a pull-type communication or a push-type communication.

In an embodiment, one or more slices may be generated at least in part from digital content. As also mentioned, coding techniques, such as linear coding techniques and/or other coding techniques, for example, may be utilized at least in part. Of course, claimed subject matter is not limited in scope to linear coding techniques, for example. Further, one or more slices may be communicated, in an embodiment, again, as a push-type communication or as a pull-type communication, for example. As explained above, slices may be generated in a manner so that a computing device, such as computing device 110, is able to construct and/or reconstruct digital content even in the event some slices may be lost and/or delayed via communication across a network. Additionally, in an embodiment, slices may be generated by multiple computing devices, such as 120, for example, to further reduce risk of potential loss and/or potential delay of communication of digital content, as previously described.

Figure 6:
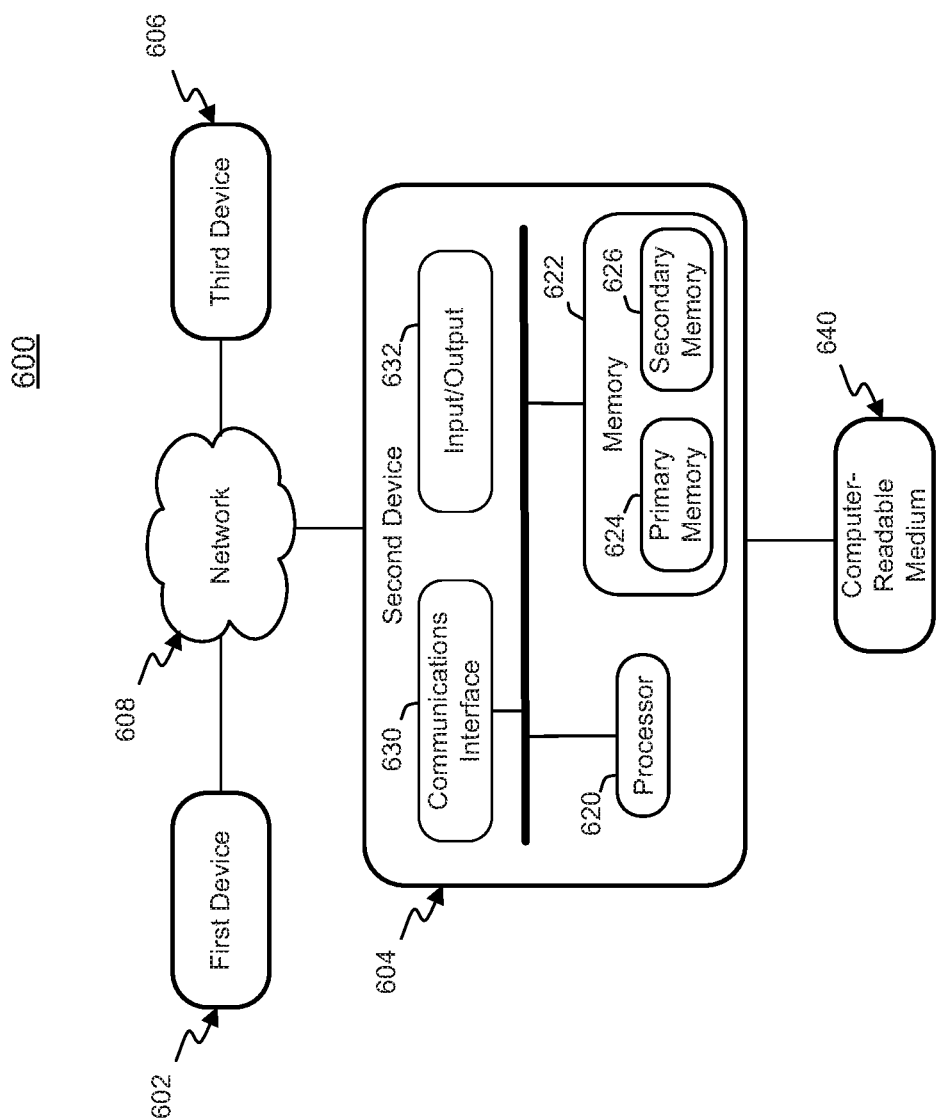
FIG. 6 is a schematic diagram illustrating a further example of computing devices of a network in accordance with an embodiment.

For purposes of illustration, FIG. 6 is an illustration of an embodiment of a system 600 that may be employed, such as described infra. in connection with digital content transfer, for example. In FIG. 6, computing device 602 ('first device' in FIG. 6), which may comprise features of a client computing device and/or server computing device, for example, may interface with computing device 604 ('second device' in FIG. 6), which may comprise features of a client computing device and/or server computing device, for example. Communications interface 630, processor (e.g., processing device) 620, and non-transitory memory 622, which may comprise primary memory 624 and secondary memory 626, may communicate by way of a communication bus, for example. In FIG. 6, computing device 602 may represent one or more sources of analog, uncompressed digital, lossless compressed digital, and/or lossy compressed digital formats for digital content of various types, such as electronic documents, video, imaging, text, audio, etc. in the form physical states and/or signals, for example. Computing device 602 may communicate with computing device 604 by way of a network, such as a network communication connection, such as an internet connection, via network 608, for example. Although computing device 604 of FIG. 6 shows the above-identified components, claimed subject matter is not limited to computing devices having only these components as other implementations may include alternative arrangements that may comprise additional components or fewer components, such as components that function differently while achieving similar results, for example. Rather, examples are provided merely as illustrations. It is not intended that claimed subject matter be limited in scope to illustrative examples.

Processor 620 may be representative of one or more circuits, such as digital circuits, to perform at least a portion of a computing procedure and/or process. By way of example, but not limitation, processor 620 may comprise one or more processors, such as controllers, microprocessors, microcontrollers, application specific integrated circuits, digital signal processors, programmable logic devices, field programmable gate arrays, and/or the like, and/or any combination thereof. In implementations, processor 620 may perform signal processing to manipulate signals and/or states, to generate signals and/or states, etc., for example.

Memory 622 may be representative of any storage mechanism. Memory 622 may comprise, for example, primary memory 624 and secondary memory 626, additional memory circuits, mechanisms, or combinations thereof may be used. Memory 622 may comprise, for example, random access memory, read only memory, etc., such as in the form of one or more storage devices and/or systems, such as, for example, a disk drive, an optical disc drive, a tape drive, a solid-state memory drive, etc., just to name a few examples. Memory 622 may be utilized to store a program. Memory 622 may also comprise a memory controller for accessing computer readable-medium 640 that may carry and/or make accessible digital content, which may include code, and/or instructions, for example, executable by processor 620 and/or some other device, such as a controller and/or processor, capable of executing instructions, for example.

Under direction of processor 620, memory, such as memory cells storing physical states, comprising, for example, a program of instructions, may be executed by processor 620 and signals generated as a result of program instruction execution may be communicated via a network, such as the Internet, for example. Device 604, as a result of program instructions being execution on processor 620, for example, may also communicate digitally-encoded signals with respect to computing device 602.

Network 608 may comprise one or more network connections, links, processes, services, applications and/or resources to support exchanging signals between a computing device, such as 602, and computing device 606 (third device' in FIG. 6), which may, for example, comprise one or more client computing devices and/or server computing devices. By way of example, but not limitation, network 608 may comprise wireless and/or wired communication links, telephone and/or telecommunications systems, Wi-Fi networks, Wi-MAX networks, the Internet, a local area network (LAN), a wide area network (WAN), or any combinations thereof.

The term "computing device," as used herein, refers to a system and/or a device, such as a computing apparatus, that includes a capability to process (e.g., perform computations) and/or store digital content, such as electronic documents, measurements, text, images, video, audio, etc. in the form of signals and/or states. Thus, a computing device, in this context, may comprise hardware, software, firmware, or any combination thereof (other than software per se). Computing device 604, as depicted in FIG. 6, is merely one example, and claimed subject matter is not limited in scope to this particular example. For one or more embodiments, a computing device may comprise any of a wide range of digital electronic devices, including, but not limited to, personal desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, or any combination of the above. Further, unless specifically stated otherwise, a process as described herein, with reference to flow diagrams and/or otherwise, may also be executed and/or affected, in whole or in part, by a computing device.

Memory 622 may store cookies relating to one or more users and may also comprise a computer-readable medium that may carry and/or make accessible digital content, including code and/or instructions, for example, executable by processor 620 and/or some other device, such as a controller and/or processor, capable of executing instructions, for example. A user may make use of an input device, such as a computer mouse, stylus, track ball, keyboard, and/or any other similar device capable of receiving user actions and/or motions as input signals. Likewise, a user may make use of an output device, such as a display, a printer, etc., and/or any other device capable of providing signals and/or generating stimuli for a user, such as visual stimuli, audio stimuli and/or other similar stimuli. Thus, input/output block 632 may be involved in connection with processing of signals, such as the foregoing, for example.

Regarding aspects related to a communications and/or computing network, a wireless network may couple devices, including client devices, with a network. A wireless network may employ stand-alone ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including Long Term Evolution (LTE), WLAN, Wireless Router (WR) mesh, 2nd, 3rd, or 4th generation (2G, 3G, or 4G) cellular technology and/or the like. Network access technologies may enable wide area coverage for devices, such as client devices, with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra wideband (UWB), 802.11b/g/n, and/or the like. A wireless network may include virtually any type of now known and/or to be developed wireless communication mechanism by which signals may be communicated between devices, between networks, within a network, and/or or the like.

Communications between a computing device and/or a network device and a wireless network may be in accordance with known and/or to be developed network protocols including, for example, global system for mobile communications (GSM), enhanced data rate for GSM evolution (EDGE), 802.11b/g/n, and/or worldwide interoperability for microwave access (WiMAX). A computing device and/or a networking device may also have a subscriber identity module (SIM) card, which, for example, may comprise a detachable or embedded smart card that is able to store subscription content of a user, and/or is also able to store a contact list of the user. A user may own the computing device and/or networking device or may otherwise be a user, such as a primary user, for example. A computing device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a computing and/or communication network may be embodied as a wired network, wireless network, or any combinations thereof.

A device, such as a computing and/or networking device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

A computing and/or network device may include and/or may execute a variety of now known and/or to be developed operating systems, derivatives and/or versions thereof, including computer operating systems, such as a Windows, iOS, Linux, a mobile operating system, such as iOS, Android, Windows Mobile, and/or the like. A computing device and/or network device may include and/or may execute a variety of possible applications, such as a client software application enabling communication with other devices, such as communicating one or more messages (e.g., content), such as via protocols suitable for transmission of email, short message service (SMS), and/or multimedia message service (MMS), including via a network, such as a social network, formed at least in part by a portion of a computing and/or communications network, including, but not limited to, Facebook, LinkedIn, Twitter, Flickr, and/or Google+, to provide only a few examples. A computing and/or network device may also include and/or execute a software application to process and/or communicate digital content, such as, for example, textual content, digital multimedia content, and/or the like. A computing and/or network device may also include and/or execute a software application to perform a variety of possible tasks, such as browsing, searching, playing various forms of digital content, including locally stored and/or streamed video, and/or games such as, but not limited to, fantasy sports leagues. The foregoing is provided merely to illustrate that claimed subject matter is intended to include a wide range of possible features and/or capabilities.

A network may also be extended to another device communicating as part of another network, such as via a virtual private network (VPN). To support a VPN, broadcast domain signal transmissions may be forwarded to the VPN device via another network. For example, a software tunnel may be created between a logical broadcast domain, and a VPN device. Tunneled traffic may, or may not be encrypted, and a tunneling protocol may be substantially compliant with and/or substantially compatible with any now known and/or to be developed versions of any of the following protocols: IPSec, Transport Layer Security, Datagram Transport Layer Security, Microsoft Point-to-Point Encryption, Microsoft's Secure Socket Tunneling Protocol, Multipath Virtual Private Network, Secure Shell VPN, another existing protocol, and/or another protocol that may be developed.

A network may communicate via signal packets, such as in a network of participating digital communications. A broadcast domain may be substantially compliant and/or substantially compatible with, but is not limited to, now known and/or to be developed versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A broadcast domain may employ, for example, TCP/IP, UDP, DECnet, NetBEUI, IPX, Appletalk, other, and/or the like. Versions of the Internet Protocol (IP) may include IPv4, IPv6, other, and/or the like.

Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result. In this context, operations and/or processing involve physical manipulation of physical quantities. Typically, although not necessarily, such quantities may take the form of electrical and/or magnetic signals and/or states capable of being stored, transferred, combined, compared, processed or otherwise manipulated as electronic signals and/or states representing various forms of digital content, such as signal measurements, text, images, video, audio, etc. It has proven convenient at times, principally for reasons of common usage, to refer to such physical signals and/or physical states as bits, values, elements, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities within memories, registers, and/or other storage devices, transmission devices, and/or display devices of the special purpose computer and/or similar special purpose computing and/or network device. In the context of this particular patent application, as mentioned, the term "specific apparatus" may include a general purpose computing and/or network device, such as a general purpose computer, once it is programmed to perform particular functions pursuant to instructions from program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation and/or a physical change and/or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

The invention claimed is:

1. A method, comprising:
   receiving a first request for a first block of digital content from a remote device, the first request being made according to a first network protocol;
   ascertaining a quantity of slices to generate for transmission of the first block of digital content, wherein ascertaining a quantity of slices comprises:
      determining a first quantity of slices associated with at least one of constructing or reconstructing the first block of digital content;
      estimating at least one of a potential digital content delay or a potential digital content loss associated with the first block of digital content based, at least in part, on communications transmitted in relation to prior requests for blocks of content;
      determining a compensation value based, at least in part, on the estimation; and
      determining the quantity of slices to generate for transmission of the first block of digital content based, at least in part, on a combination of the first quantity of slices and the compensation value;
   generating a plurality of vectors according to the quantity, each vector of the plurality of vectors including a plurality of binary values;
   generating a plurality of slices of the first block of digital content according to the plurality of vectors such that one or more slices of the plurality of slices contain partially redundant content of the first block of digital content, each slice of the plurality of slices of the first block of digital content corresponding to at least one vector of the plurality of vectors; and
   transmitting the plurality of slices of the first block of digital content using a second network protocol.

2. The method of claim 1, wherein transmitting the plurality of slices comprises:
   transmitting a plurality of signal packets formatted according to the second network protocol.

3. The method of claim 2, wherein each signal packet of the plurality of signal packets includes at least one slice of the plurality of slices.

4. The method of claim 1, wherein the first block of digital content comprises digital video content.

5. The method of claim 1, comprising receiving a second request for a second block of digital content from the remote device.

6. The method of claim 5, comprising:
   receiving an indication that one or more slices of the second block of digital content were not received by the remote device.

7. The method of claim 6, comprising:
   providing the one or more slices of the second block of digital content that were not received using the second network protocol.

8. The method of claim 1, each binary value of the plurality of binary values corresponding to at least one byte of a plurality of bytes of the first block of digital content.

9. The method of claim 1, each byte of a plurality of bytes of the first block of digital content being transmitted in two or more slices of the plurality of slices.

10. The method of claim 1, wherein a first vector of the plurality of vectors is different than a second vector of the plurality of vectors.

11. The method of claim 1, wherein transmitting the plurality of slices comprises:
   transmitting a plurality of packets using the second network protocol, each packet of the plurality of packets identifying the first block of digital content.

12. The method of claim 1, comprising:
   establishing a network connection with the remote device using the first network protocol.

13. The method of claim 1, wherein transmitting the plurality of slices comprises:
   encoding, for each slice of two or more slices of the plurality of slices, a corresponding slice vector that indicates one or more bytes of the first block of digital content that are not being transmitted in the corresponding slice and that indicates values of two or more bytes of the first block of digital content that are being transmitted in the corresponding slice.

14. The method of claim 1, wherein the plurality of slices are generated based, at least in part, by applying vectors on a matrix representing the first block of digital content.

15. An apparatus comprising:
   at least one computing device configured to:
      receive a first request for a first block of digital content from a remote device, the first request being made according to a first network protocol;
      ascertain a quantity of slices to generate for transmission of the first block of digital content, wherein ascertaining a quantity of slices comprises:
         determining a first quantity of slices associated with at least one of constructing or reconstructing the first block of digital content;
         estimating at least one of a potential digital content delay or a potential digital content loss associated with the first block of digital content based, at least in part, on communications transmitted in relation to prior requests for blocks of content;

determining a compensation value based, at least in part, on the estimation; and determining the quantity of slices to generate for transmission of the first block of digital content based, at least in part, on a combination of the first quantity of slices and the compensation value;

generate a plurality of vectors according to the quantity, each vector of the plurality of vectors including a plurality of binary values;

generate a plurality of slices of the first block of digital content according to the plurality of vectors such that one or more slices of the plurality of slices contain partially redundant content of the first block of digital content, each slice of the plurality of slices of the first block of digital content corresponding to at least one vector of the plurality of vectors; and transmit the plurality of slices of the first block of digital content using a second network protocol.

16. The apparatus of claim 15, wherein the quantity of slices is ascertained based, at least in part, on at least one of a potential digital content delay or an estimated potential digital content loss.

17. The apparatus of claim 15, wherein the at least one computing device is configured to:

receive a second request for a second block of digital content from the remote device;

receive an indication that one or more slices of the second block of digital content were not received by the remote device; and provide the one or more slices of the second block of digital content that were not received using the second network protocol.

18. A storage medium having stored thereon computer instructions executable by at least one computing device, the at least one computing device including at least one processor and at least one memory, the computer instructions to be fetched from the at least one memory for execution on the at least one processor, the computer instructions configured to cause the at least one computing device to:

receive a first request for a first block of digital content from a remote device, the first request being made according to a first network protocol;

ascertain a quantity of slices to generate for transmission of the first block of digital content, wherein ascertaining a quantity of slices comprises:

determining a first quantity of slices associated with at least one of constructing or reconstructing the first block of digital content;

estimating at least one of a potential digital content delay or a potential digital content loss associated with the first block of digital content based, at least in part, on communications transmitted in relation to prior requests for blocks of content;

determining a compensation value based, at least in part, on the estimation; and determining the quantity of slices to generate for transmission of the first block of digital content based, at least in part, on a combination of the first quantity of slices and the compensation value;

generate a plurality of vectors according to the quantity, each vector of the plurality of vectors including a plurality of binary values;

generate a plurality of slices of the first block of digital content according to the plurality of vectors such that one or more slices of the plurality of slices contain partially redundant content of the first block of digital content, each slice of the plurality of slices of the first block of digital content corresponding to at least one vector of the plurality of vectors; and transmit the plurality of slices of the first block of digital content using a second network protocol.

19. The storage medium of claim 18, wherein the quantity of slices is ascertained based, at least in part, on an estimated potential digital content loss.

20. The storage medium of claim 18, wherein the computer instructions are configured to cause the at least one computing device to:

receive a second request for a second block of digital content from the remote device;

process an indication that one or more slices of the second block of digital content were not received by the remote device; and provide the one or more slices of the second block of digital content that were not received using the second network protocol.

* * * * *